United States Patent [19]

Myers

[11] 4,454,604
[45] Jun. 12, 1984

[54] VIRTUAL TIME BASE DIRECT SYNCHRONIZER AND METHOD THEREFOR

[75] Inventor: Michael H. Myers, Scottsdale, Ariz.

[73] Assignee: Motorola Inc., Schaumburg, Ill.

[21] Appl. No.: 364,704

[22] Filed: Apr. 2, 1982

[51] Int. Cl.³ .................... H04B 15/00; H04L 25/36
[52] U.S. Cl. ........................................ 375/1; 375/118;
329/122; 364/828; 455/29
[58] Field of Search ...................... 375/1, 97, 118, 119,
375/120; 455/29; 364/732, 828; 329/50, 122;
331/1 A; 343/17.2, 14; 307/511, 529; 328/72,
74, 155

[56] References Cited

U.S. PATENT DOCUMENTS

| 4,061,977 | 12/1977 | Motley et al. | 375/118 |
| 4,285,060 | 8/1981 | Cobb et al. | 375/1 |
| 4,328,587 | 5/1982 | Mizuno et al. | 375/118 |
| 4,361,891 | 11/1982 | Lobenstein et al. | 375/1 |

Primary Examiner—Benedict V. Safourek
Attorney, Agent, or Firm—Eugene A. Parsons; Lewis S. Gruber

[57] ABSTRACT

A system for virtual time base direct synchronization in which a hopping sequence signal grossly synchronized with a received hopped base band has a fine synchronization correction performed by a virtual time shift of the hopping reference through first derivative subtraction of the phase of a hopped carrier signal, which in effect brings the hopping sequence signal into time alignment with the received hopped base band.

11 Claims, 7 Drawing Figures

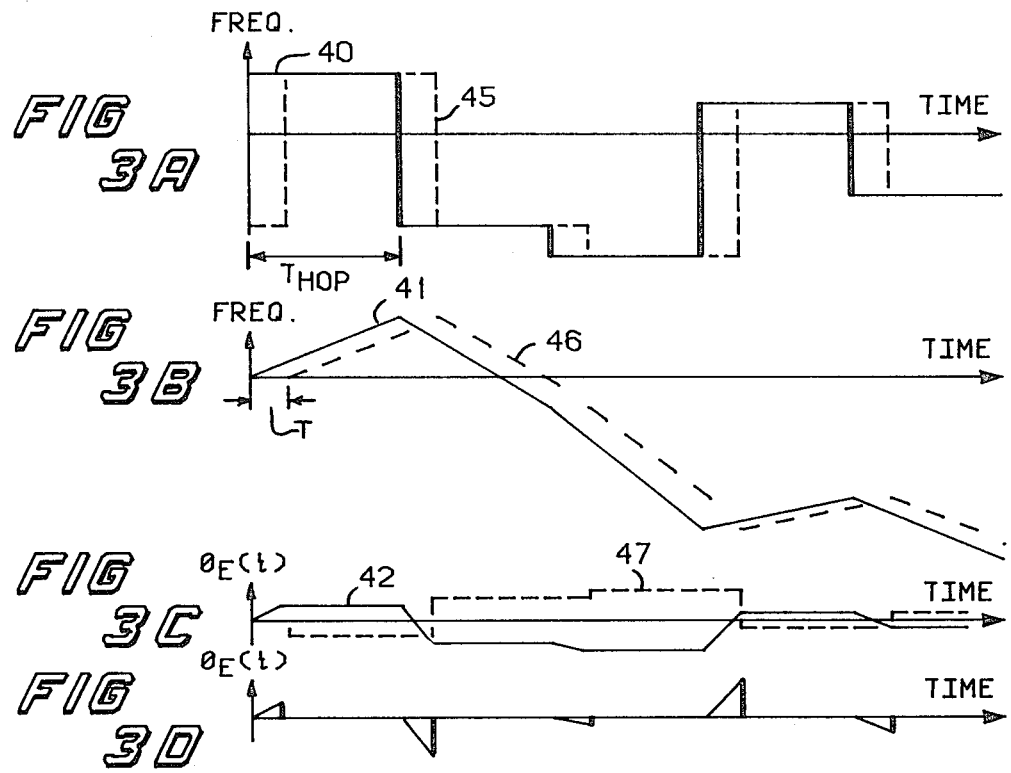
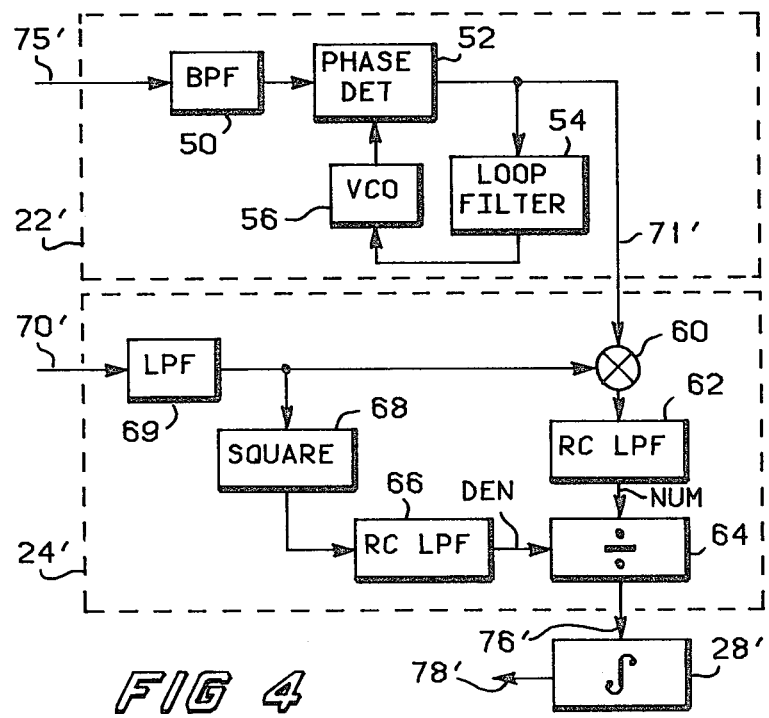

VIRTUAL TIME BASE DIRECT SYNCHRONIZER AND METHOD THEREFOR

BACKGROUND OF THE INVENTION

The present invention relates to continuous phase frequency hopping (CPFH) synchronizing apparatus and methods therefor, and more particularly to CPFH synchronizers having a virtual time base synchronization element and methods therefor.

Systems which make use of frequency hopped signals generally have a problem of epoch synchronization, that is of adjusting the time at which the receiver waveforms are hopped in order to coincide with the hopping of an incoming signal.

A common approach to achieving epoch synchronization in spread spectrum systems involves the use of a means for varying the delay of the spreading modulation. This delay is commonly implemented by either passing the spreading modulation through a variable delay element or by adding or deleting clock cycles in a digital waveform generator. However, by physically changing the time base in this way, an undesirable phase transient is introduced at the moment of correction.

Another approach to providing epoch synchronization involves measuring timing error, closing a first order loop to adjust synchronization by moving the hopping waveform to adjust the time at which hopping occurs to line up with the incoming signal, and then stabilizing the timing by stabilizing the temperature of the receiver. Oven temperature-stabilized timing is however costly and cumbersome.

SUMMARY OF THE INVENTION

Accordingly it is an object of the present invention to provide a new and improved direct synchronizer for use with a continuous wave frequency hopped signal.

It is a further object of the present invention to provide a new and improved virtual time base synchronizer wherein delay variations of the carrier phase can be eliminated, thereby avoiding large phase transients.

Another object of the present invention is to provide a new and improved virtual time base direct synchronizer having a very high resolution.

Among the advantages of the present invention is the ability to implement a range of delays having from relatively large to arbitrarily small values, notably values much shorter than a clock cycle.

These and other objects and advantages of the present invention will become apparent to those skilled in the art upon consideration of the accompanying specification, claims and drawings.

In order to attain the above mentioned objects and advantages the apparatus of the present invention involves the virtual time base direct synchronizer for use in aligning a hopped carrier with a continuous wave frequency hopped signal comprising means for generating a signal indicative of an estimated phase error in the form of a scaled first derivative of the hopped carrier signal coupled to means for subtracting signals.

The method of the present invention involves virtual time based direct synchronization for use in aligning a frequency hopped carrier with a continuous wave frequency hopped signal comprising the steps of generating a signal indicative of an estimated phase error in the form of a part of a scaled first derivative of the hopped carrier signal and subtracting the estimated phase error from the hopped carrier signal.

BRIEF DESCRIPTION OF THE DRAWINGS

FIGS. 3A through 3D are waveforms illustrating the operation of the preferred embodiment of the present invention; and FIG. 4 is a block diagram of a preferred embodiment of a pilot tone extractor and a preferred embodiment of a timing error estimator for use in the present invention.

DESCRIPTION OF THE PREFERRED EMBODIMENT

Figure 1:
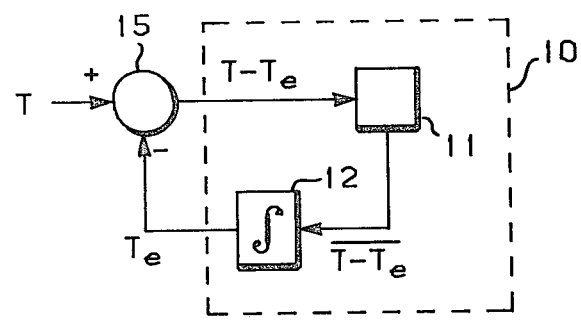
FIG. 1 is a block diagram of a first order servo according to the preferred embodiment of the present invention.

In a preferred embodiment of a first order servo according to the present invention as illustrated in FIG. 1, a signal generator providing a signal indicative of an estimated phase error in the form of a part of a scaled first derivative of the hopped carrier signal 10 has an input coupled to an output of a subtractor 15 and has an output coupled to a negative input of subtractor 15. Signal generator 10 comprises a timing error estimator 11 having an input coupled to the output of subtractor 15 and having an output coupled to an input of an integrator 12 which in turn has an output coupled to a negative input of the subtractor 15. Subtractor 15 has a positive input for application of a signal having a timing error to be reduced.

The method involved in the servo of FIG. 1 is easily understood by consideration of the case where a signal indicative of a phase error T is applied to the positive input of subtractor 15, as shown in FIG. 1. A signal indicative of an estimated phase error, $T_e$ is applied to a second terminal of subtractor 15 so that the output of subtractor 15 has a phase error equal to $T-T_e$. This signal, indicative of a phase error $T-T_e$, is then applied to timing error estimator 11 the output of which is the time average of $T-T_e$ which when integrated in integrator 12 provides a new value for $T_e$ to be applied to the second input of subtractor 15. It is clear to one skilled in the art that by repeatedly applying this process T can be driven to 0.

Figure 2:
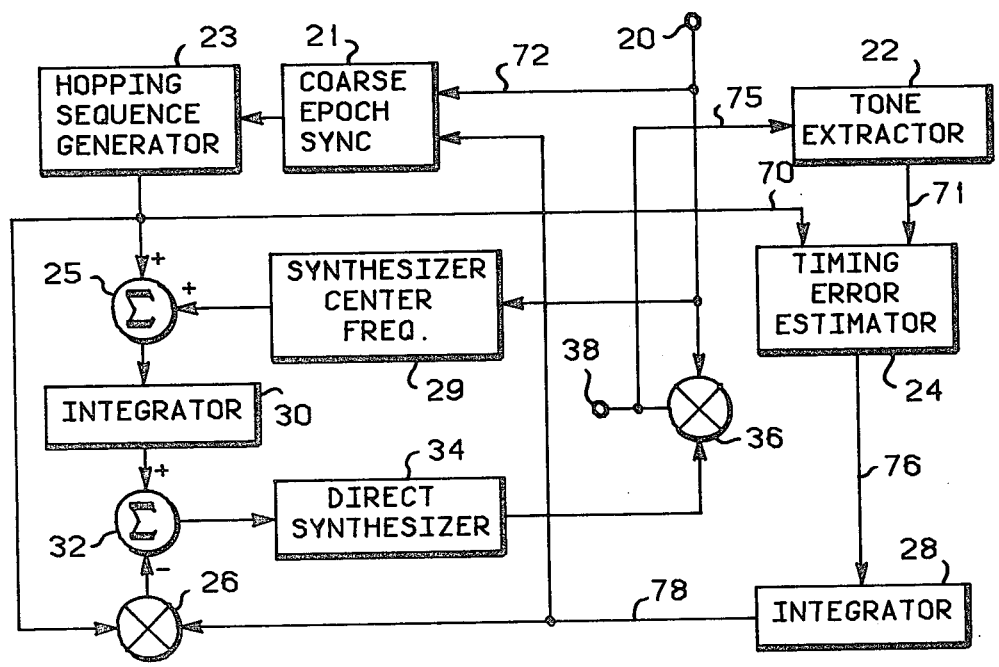
FIG. 2 is a block diagram of a preferred embodiment of the present invention.

A simplified block diagram of the preferred embodiment of the virtual time base synchronizer according to the present invention is shown in FIG. 2. In FIG. 2, the receiver timing control system is embedded in a hopping/dehopping system wherein a pilot tone is received as part of the hopped signal.

A timing control system input 20 is coupled to a first input 72 of a coarse epoch synchronizer 21 and to an input of a source of a synthesizer center frequency 29. An output of coarse epoch synchronizer 21 is coupled to an input of a hopping sequence generator 23 which in turn has an output coupled to a first input 70 of a timing error estimator 24, to a first input of a summing device 25 and to a first input of a multiplier 26. A second input 71 of timing error estimator 24 is coupled to an output of a pilot tone extractor 22.

An output 76 of timing error estimator 24 is coupled to an input of an integrator 28 an output 78 of which is coupled to a second input of multiplier 26 and to a second input of coarse epoch synchronizer 21.

A second input of summing device 25 is coupled to an output of source of a synthesizer center frequency 29 and an output of summing device 25 is coupled to an input of an integrator 30. An output of integrator 30 is coupled to a first input of a summing device 32 while a second input of summing device 32, opposite in sign to the first input, is coupled to an output of multiplier 26.

An output of summing device 32 is coupled to an input of a direct synthesizer 34 and an output of direct synthesizer 34 is coupled to a first input of a multiplier 36. A second input of multiplier 36 is coupled to system input 20 while an output of multiplier 36 is coupled to a system output 38 and also coupled by line 75 to an input of pilot tone extractor 22.

Coarse epoch synchronizer 21 may comprise a timing logic circuit having a first input coupled through a demodulator to the first input of coarse epoch synchronizer 21 and having a second input coupled successively through an analog-to-digital converter and an addressable memory to the output of synchronizer 21. Direct synthesizer 34 may comprise an addressable memory programmed with values of $e^{j(x)}$, where x is a value applied at the input of the memory, coupled to a digital-to-analog converter. Center frequency source 29 may comprise a phase locked loop.

Hopping sequence generators, integrators, multipliers, and summing circuits are well known to those skilled in the art and will not be described further. A pilot tone extractor and a timing error estimator for use in the preferred embodiment of the present invention are described below.

In a hopping/dehopping system, a base band signal is transmitted with phase modulation, and the received hopped signal is dehopped by mixing it with an identically phase modulated carrier. If the receiver hops in synchrony with the transmitter, only the transmitted information carried in the phase of the transmitted signal appears in the dehopped baseband. However, if the receiver and the transmitter do not hop synchronously, a phase error results that appears as noise modulation in the dehopped baseband.

Normally dehopping is accomplished using the output of a numerically controlled oscillator driven from the integrated output of a hopping generator. The type of synthesizer employed in the preferred embodiment is direct, phase continuous, which means that a waveform $\phi(t)$ applied at the input results in a phase modulated sine wave, $\sin \phi(t)$, at the output. In order to simplify calculations, the synthesizer may be treated as a device with an input $\phi(t)$ and an output equal to the complex exponential $e^{j\phi(t)}$. If the synthesizer is used to dehop a received hop signal expressed as $B(t)e^{-j\phi(t)}$ but the synthesizer phase function is not synchronized with the received signal so that the synthesizer output is in the form $e^{j\phi(t+T)}$, where T is the introduced timing error, the dehopped signal is expressible as:

$$(B(t)e^{+j\phi(t+T)-\phi(t)})$$

The argument of the exponential in the expression for the dehopped signal should ideally be 0. Because the direct synthesizer permits the generation of a sinusoid having a specified phase argument, the residual phase error in the output, equal to $\phi(t+T)-\phi(t)$, may be cancelled by subtracing it from the specified synthesizer input phase function.

Turning now to FIG. 3A, wherein $w_o$ is the synthesizer center frequency, $w_x(t)$ is a random amplitude square wave which defines frequency values (in radians/second) uniformly distributed between $-w_p$ and $+w_p$ which square wave has a period $T_{HOP}$, a continuous phase modulation wave form $\phi(t)$ can be defined as follows:

$$\phi(t) = w_o T + \int_o^t w_x(q)dq$$

In FIG. 3A, a waveform 40 represents the frequency hopping $s_x(t)$ of the received signal and a dashed line 45 represents a waveform indicative of the frequency hopping of the receiver, $w_x(t+T)$, out of synchrony with the received hopped frequency.

In FIG. 3B, a received phase modulation waveform 41 having phase modulation $\phi(t)$ is shown as an integral of the received reference frequency function waveform 40 in FIG. 3A. Phase modulation waveform 46 having phase modulation $\phi(t+T)$ is shown in FIG. 3B as an integral of the delayed reference frequency function waveform 45 in FIG. 3A. The phase error embodied in waveform 46 is shown in FIG. 3B as the difference between waveforms 41 and 46, T. For this case, a residual phase error, $\phi_E(t)$, may be expressed as, $$\phi_E(t) = \phi(t+T) - \phi(t)$$

Therefore, when T is much less than $T_{HOP}$, $\phi_E(t)$ is approximately equal to $T[d\phi(t)/dt]$. Furthermore, $\phi_E$ is approximately equal to $T[d\phi(t)/dt]$ and $$(d\phi(t)/dt) = w_o + w_x(t)$$

Thus, by subtracting $T[d\phi(t)/dt]$ from $\phi(t+T)$ one obtains an approximation of $\phi(T)$. When T is much less than $T_{HOP}$, it can be shown that subtraction of $T[d\phi(t)/dt]$ from $\phi(t+T)$ yields cancellation of the phase error except for the residual error $w_x(t+T)-w_x(t)$ which is very small compared to $w_x(t)$.

The delay, T, is easily estimated by sending an unmodulated pilot tone in the transmitted hopped signal, B(t), which pilot tone will contain after dehopping the residual phase modulation, $T(d\phi/dt)$. Because the term $w_o T$ is constant in the expression for $\phi(t)$, it does not cause a despreading error, and there is, therefore, no need to cancel it in the dehopped residual phase error. The synchronization attained by the present invention must therefore be called "virtual" inasmuch as true time correction would also cancel the term $w_o T$. "True" time base correction is accomplished, for example, by delaying or advancing the output of the direct synchronizer with a delay line or by changing the clock timing in the direct synchronizer that defines the hopped time. Such "true" time base correction does cancel the term $w_o T$ in the expression for $\phi(t)$ and therefore introduces the phase transient $-w_o T$, which could be quite large.

In FIG. 3C the error phase is shown as a solid line 42 representative of $\phi(t)-\phi(t+T)$. A cancelling waveform 47 such as supplied by the virtual time base synchronizer of the present invention is shown as a dashed line having the value $Tw_x(t+T)$.

FIG. 3D is an enlarged depiction of the residual phase error remaining after the correction performed as in FIG. 3C by the virtual time base synchronizer of the present invention. The residual phase error as depicted in FIG. 3D is understood by one skilled in the art to be negligible.

Returning now to FIG. 2, it will be understood by those skilled in the art that the received hopped baseband is introduced into the system through input 20 and applied to a first input of coarse epoch synchronizer 21, to an input of center frequency synthesizer 29, and to an input of multiplier 36. The second input 71 of timing error estimator 24 is supplied with the extracted pilot tone from pilot tone extractor 22. Element 22 extracts the pilot tone from the dehopped baseband applied to its input which is coupled to the output of multiplier 36. Element 21 coarsely synchronizes the hopping sequence of generator 23 with the hopping sequence of the received signal to an accuracy T. The output signal from hopping sequence generator 23 is applied through second estimator input 70 to timing error estimator 24 and is correlated therein with the hopping signal of the pilot tone extracted in element 22 to provide a best estimate of the average remaining timing error, $(\overline{T-T_e})$. This estimate is integrated in integrator 28 to provide a new estimated timing error, $t_{eNEW}$, to be used for further corrections.

The signal from the output of integrator 28 is multiplied by the output of the hopping sequence generator 23 in multiplier 26 and the result is applied to the negative input of summing circuit 32. The output of hopping sequence generator 23 is summed with the output of synthesizer center frequency generator 29 in element 25 and applied to the input of integrator 30 the output of which integrator is applied to a positive input of summing circuit 32.

Therefore, the output of summing circuit 25 may be expressed as a phase function, $\phi_{IN}(t)$, as follows:

$$\phi_{IN}(t) = -T_e w_x(t+T) + w_o(t+T) + \int_{-\infty}^{t+T} w_x(q)dq$$

The output of direct synthesizer 34 thus becomes $e^{j\phi IN(t)}$, so that for a received input signal having a frequency of $w_c t$ and a phase function of $\phi(t)$ and being expressed as $e^{-j(w_c t + \phi(t))}$, the output of multiplier 36 may be expressed as $$(T-T_e)\overline{w_x}(t) - T_e T \dot{w}_x(t)$$

The first term in the argument of this exponential expression for the output of multiplier 36 represents the desired frequency modulation, the second term represents the constant phase error which can be ignored because phase reference in demodulation is derived from the carrier, the third term of the exponential is driven to 0 by the servo embodied in the present invention and the fourth term of the argument of the exponential is negligible.

Turning now to FIG. 4 in which structures similar to those in other figures are identified by the same numerals as in those figures followed by a prime, an embodiment of a pilot tone extractor 22′ an embodiment of a timing error estimator 24′ and an integrator 28′ are shown. Extractor input 75′ is adapted for application of the dehopped base band. Input 75′ is coupled to an input of a band pass filter 50, an output of which is coupled to a first input of a phase detector 52. An output of phase detector 52 is coupled to a timing error estimator input 71′ and to an input of a loop filter 54. The output of loop filter 54 is coupled to an input of a voltage controlled oscillator 56 the output of which is coupled to a second input of phase detector 52 to provide a phase locked loop comprising elements 52, 54 and 56 for the extraction of a pilot tone. The output signal of pilot tone extractor 22′ may be expressed as:

$$(T-T_e)\overline{w_x}(t) - T_e T \dot{w}_x(t)$$

A second timing error estimator input 70′ is coupled to an input of a low pass filter 69 an output of which is coupled to a first input of a multiplier 60 and to an input of squaring circuit 68. In general, filter 69 is matched to filter 50 in terms of the number of poles to achieve optimal correlation. An output of squaring circuit 68 is coupled to an input of an RC low pass filter 66 the output of which is coupled to the denominator input of a dividing circuit 64.

A second input of multiplier 60 is coupled to estimator input 71′. An output of multiplier 60 is coupled to an input of an RC low pass filter 62 the output of which is coupled to a numerator input of dividing circuit 64. An output of dividing circuit 64 is coupled to a timing error estimator output 76′ which is in turn coupled to an input of integrator 28′ having output 78′.

The input signal, $w_x(t+T)$, applied by hopping sequence generator 23 to estimator input 70′ is averaged in low pass filter 69 having a first time constant to provide an output expressible as $$\overline{w_x}(t+T)$$

This output of filter 69 is multiplied by the output of signal from pilot tone extractor 22′ in multiplier 60 to yield a signal at the output of multiplier 60 which is approximately equal to $$(T-T_e)\overline{w_x}^2(t)$$

The output of filter 69 is also squared in squaring circuit 68 and averaged in filter circuit 66 having a second time constant greater than the time constant of filter 69 (as indicated by longer line above the averaged quantity) to yield a signal expressible as $$\overline{\overline{w_x^2}(t)}$$

Likewise the output of multiplier 60 is averaged in filter 62 to yield a signal expressible as $$\overline{(T-T_e)\overline{w_x^2}(t)}$$

so that when the signal from filter 62 is divided by the signal from filter 66 in dividing circuit 64, the output of circuit 64 may be expressed as $$T - T_e(t)$$

Integrating the signal from output 76′ of estimator 24′ results in a signal, $T_{eNEW}$, which represents a new estimate of the timing error which is then passed through the servo loop of the present invention to continue the process of driving the timing error to 0.

While the present invention has been described in terms of a preferred embodiment, further modifications and improvements will occur to those skilled in the art. For example, instead of being coupled to the output of integrator 28, the coarse epoch synchronizer may be set at some estimated level, a $T_e$ obtained and the coarse synchronizer set to provide coarse synchronization. In fact, the fine synchronization provided by the present invention may be used to provide total synchronization if optimal results are not required. As another example, where optimal results are not required, the division performed in element 64 may be replaced by an averaging element.

I desire it to be understood, therefore, that this invention is not limited to the particular form shown and that I intend in the appended claims to cover all such equivalent variations which come within the the scope of the invention as described.

I claim:

1. A virtual time base direct synchronizer for use in aligning a hopped carrier signal, hopped by a hopping sequence signal, with a continuous phase frequency hopped signal comprising:

means for generating a signal indicative of an estimated phase error in the hopped carrier signal in the form of a part of a scaled first derivative of the phase of the hopped carrier signal, and combining means coupled to said means for generating a signal indicative of an estimated phase error and further coupled to receive the hopped carrier signal for removing the estimated phase error from the hopped carrier and providing the result at an output thereof.

2. The virtual time base direct synchronizer as recited in the claim 1 wherein the continuous phase frequency hopped signal includes a pilot tone and wherein said means for generating a signal indicative of an estimated phase error includes a timing error estimator and a pilot tone extractor with the estimator being coupled to receive a coarse aligned hopped carrier signal and the extracted pilot tone.

3. The virtual time base direct synchronizer as recited in claim 2 wherein said means for subtracting signals includes a coarse epoch synchronizer and hopping sequence generator with the coarse epoch synchronizer coupled to control the hopping sequence of the hopping sequency generator.

4. A virtual time base direct synchronizer for use in aligning a carrier signal, hopped by a hopping sequence signal, with a continuous phase frequency hopped signal having a pilot tone comprising:

means for receiving the frequency hopped signal;

a hopping sequence generator having an input coupled to said means for receiving the frequency hopped signal and having an output;

means for summing signals having a first input coupled to said output of said hopping sequence generator having a second input and having an output;

a source of a center frequency signal having an input coupled to said means for receiving the continuous phase frequency hopped signal and having an output coupled to said second input of said means for summing signals;

a first multiplier having an output, having a first input and having a second input coupled to said output of said hopping sequence generator;

a timing error estimator having an output, having a first input, and having a second input coupled to said output of said hopping sequence generator;

a first integrator having an input coupled to said output of said timing error estimator and having an output coupled to said first input of said first multiplier;

a second integrator having an input coupled to said output of said means for summing signals and having an output;

means for subtracting signals having a first input coupled to said output of said first multiplier, having a second input coupled to said output of said second integrator and having an output;

a synthesizer having an input coupled to said output of said means for subtracting signals and having an output;

a second multiplier having a first input coupled to said output of said synthesizer, having a second input coupled to said means for receiving the frequency hoped signal, and having an output; and a pilot tone extractor having an input coupled to said output of said second multiplier and having an output coupled to said first input of said timing error estimator.

5. The virtual time base direct synchronizer as recited in claim 4 further comprising:

a coarse epoch synchronizer coupled between said means for receiving the continuous phase frequency hopped signal and said hopping sequence generator.

6. The virtual time base direct synchronizer as recited in claim 5 wherein said coarse epoch synchronizer further comprises an input coupled to said output of said first integrator.

7. The virtual time base direct synchronizer as recited in claim 4 wherein said pilot tone extractor comprises a bandpass filter coupled to a phase locked loop.

8. The virtual time base synchronizer as recited in claim 7 wherein said timing error estimator comprises:

a third multiplier having a first input coupled to said output of said pilot tone extractor, having a second input and having an output;

first means for averaging signals having an input coupled to said output of said hopping sequence generator and having an output coupled to said second input of said third multiplier;

means for squaring a signal having an input coupled to said output of said means for averaging signals and having an output;

second means for averaging signals having an input coupled to said output of said means for squaring a signal and having an output;

third means for averaging signals having an input coupled to said output of said third multiplier and having an output; and means for dividing signals having a first input coupled to said output of said second means for averaging signals having a second input coupled to said output of said third means for averaging signals.

9. The virtual time base direct synchronizer as recited in claim 8 wherein said means for dividing signals comprises a fourth means for averaging signals.

10. A method of virtual time base direct synchronization for use in aligning a hopped carrier signal, hopped by a hopping sequence signal, with a continuous phase frequency hopped signal having a pilot tone comprising the steps of generating a signal indicative of an estimated phase error in the hopped carrier signal in the form of a part of a scaled first derivative of the phase of the hopped carrier signal; and combining said signal indicative of an estimated phase error with said hopped carrier signal to align the hopped carrier signal with the continuous phase frequency hopped signal.

11. The method of virtual time base direct synchronization as recited in claim 10 wherein said generating step comprises:

extracting the pilot tone from the continuous phase frequency hopped signal; and estimating said phase error in the hopped carrier signal by comparing the hopping sequence signal with said pilot tone.

* * * * *